Feb. 25, 1958 R. D. TOLLEFSON ET AL 2,825,042

SPRING CONTACT FINGERS FOR SHIELD PLATES

Filed June 24, 1954

INVENTORS
ROBERT D. TOLLEFSON
CHARLES E. OTTAWAY

United States Patent Office 2,825,042
Patented Feb. 25, 1958

2,825,042

SPRING CONTACT FINGERS FOR SHIELD PLATES

Robert D. Tollefson, Cedar Rapids, and Charles E. Ottaway, Robins, Iowa, assignors to Collins Radio Company, Cedar Rapids, Iowa, a corporation of Iowa Application June 24, 1954, Serial No. 438,892

2 Claims. (Cl. 339—253)

This invention relates to securing devices, and more particularly to electrical contact and plate retaining devices such as for the support of shield plates.

In electrical apparatus, especially radio frequency systems, it is a common practice to provide electrical shields to isolate certain of the components. Such shielding takes the form of electrically conductive plates and serves to minimize or prevent electrostatic and electromagnetic coupling between the shielded components. Such plates are generally supported from the housing or chassis of the electrical apparatus, and are inserted by motion either perpendicular to or laterally of the housing or chassis portion. For effective shielding it is essential that the joint between the shield plate and the housing or chassis portion provide a good electrically conducting path.

In the prior art it is known to use for the joint structure a channel member having converging sides which are formed into a plurality of opposed spring fingers. The shield plate is inserted between the opposed fingers, which furnish both the mechanical and electrical contact between the plate and the housing. This type of device has met with considerable success, but is subject to certain disadvantages. For example, the insertion of a shield plate by lateral motion causes the plate to bind with the fingers and the fingers to be bent. Insertion by a perpendicular motion tends to collapse the fingers unless perfect alignment is obtained.

Accordingly, it is an object of this invention to provide a plate retaining and electrical contact device which overcomes the disadvantages of the prior art.

More particularly, it is an object of this invention to provide a shield plate retaining device which permits the easy insertion of the shield plate by motion either perpendicular to or laterally of the abutting plate and yet provides an unusually good electrical contact between the two plates.

Additionally, it is an object to provide a shield plate structure which is economical to manufacture, simple to manipulate, and reliable in operation.

The manner in which these and other objects are accomplished will appear from the description which follows, taken with the accompanying drawing, in which.

The inventive device comprises a channel-shaped member of resilient sheet metal formed with a re-entrant portion in its base. The sides of the channel are convergent and are formed with a plurality of oppositely disposed fingers. Means operable from one side of a support plate are provided for securing the base portion of the channel to the other side of the support plate and for flattening or compressing the re-entrant portion thereagainst. The shield plate is positioned between the fingers and the deforming of the re-entrant portion causes the fingers to move inwardly to grippingly engage the shield plate and provide electrical contact therewith.

Figure 1:
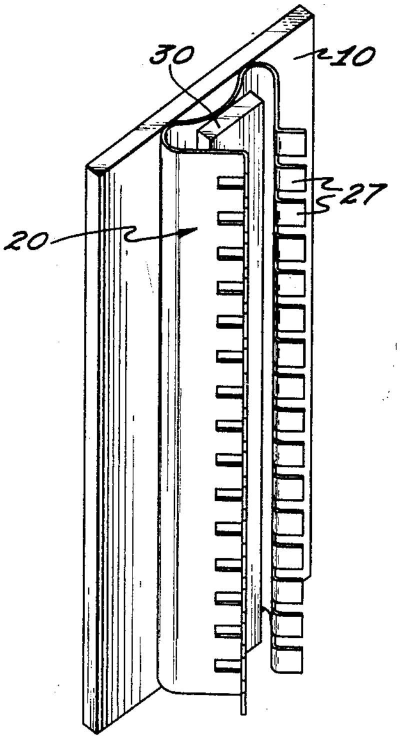
Figure 1 is a perspective view of the shield plate retaining and contact device with the channel member in the unstressed condition.
Figure 3:
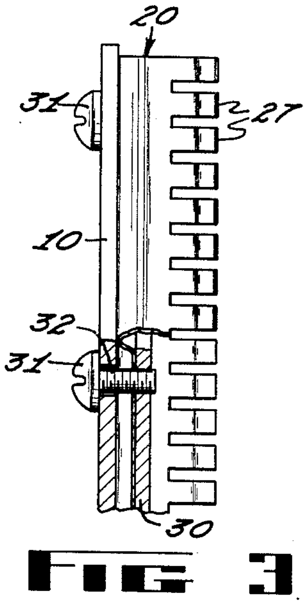
Figure 3 is an elevation view with a partial cutaway section showing the channel member in the unstressed condition.

Referring now to Figure 1, the assembly comprises a support plate 10, shown as a portion of the housing or chassis of an electrical apparatus such as a radio receiver or transmitter. The retaining member 20 is positioned against the support plate and a movable plate 30 is disposed within the retaining member.

Figure 2:
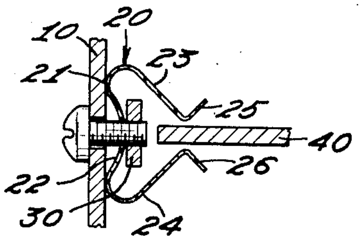
Figure 2 is a cross-sectional view of the inventive device with the channel member in unstressed condition and with the shield plate inserted.

As best shown in Figure 2, the retaining member 20 is generally of channel shape or triangular shape in cross section. The retaining device 20 is preferably formed of a thin, resilient sheet metal of good electrical conductivity, such as a beryllium-copper alloy, for example. The retaining member has a base portion 21 which is formed with a re-entrant or a crest portion 22 extending longitudinally. The sides of the member 20 form a channel with the base portion and comprise first portions 23 and 24 contiguous to the base which extend inwardly. The sides of the member 20 have second portions 25 and 26 which extend outwardly, the two portions of each side forming an apex therebetween.

Each side portion is formed with a plurality of longitudinally spaced contact fingers 27. The fingers formed in one side are disposed oppositely with respect to the fingers of the other side.

The movable pressure plate 30 is of relatively rigid construction and is disposed within the retaining member 20. The movable plate is positioned adjacent the re-entrant portion 22 and extends longitudinally of the retaining device. A plurality of fastening devices, each having a head portion 31 and a threaded shank portion 32, are provided for securing the assembly to the support plate 10. The fastening devices are disposed at spaced intervals and have the head portion engaging one side of the support plate 10. The shank portion extends through aligned openings in the support plate 10 and the re-entrant portion of the retaining member 20 into threaded engagement with the pressure plate 30.

It will be noted from Figure 2 that the space between the opposed fingers, with the retaining member in the unstressed condition, is somewhat greater than the thickness of the shield plate 40. This permits the shield plate to be readily inserted between the fingers without binding or crushing the resilient fingers. The motion of insertion may be either perpendicular to or laterally of the support plate 10.

Figure 4:
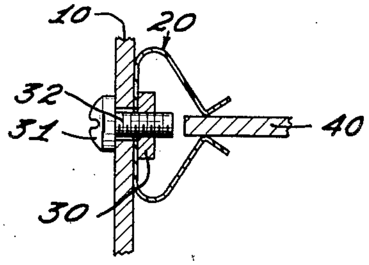
Figure 4 is a sectional view similar to that of Figure 2, but in which the channel member is in the stressed condition engaging the shield plate.

Once the shield plate 40 is inserted the fastening devices may be operated by the head portion 31 to draw the pressure plate 30 against the re-entrant portion 22 thereby compressing the latter against the support plate 10. This stressed condition of the retaining device 20 is shown in Figure 4. It will be apparent that the effect of compressing or flattening the re-entrant portion will be to cause the opposed contact fingers to move inwardly and to grippingly engage the opposite faces of the shield plate 40. The resilient structure of the retaining member 20 permits the fingers to exert considerable pressure on the shield plate, sufficient to provide mechanical support and unusually good electrical contact therewith. It will be apparent that upon loosening the fastening devices the retaining device 20, by reason of its resilience, will recover its initial unstressed shape, causing the fingers to separate and permit easy withdrawal of the shield plate 40.

Although the invention has been described with respect to particular embodiment, it is not intended that it be limited thereby. Many modifications, refinements, and applications will now occur to those skilled in the art. For a definition of the limits of the invention reference is made to the appended claims.

We claim:

1. An electrical contact and retaining device for shield plates comprising a support plate, a resilient, electrically conductive channel member, each of the sides of said member being formed with a plurality of inwardly directed, opposed fingers, the base of said channel member engaging one side of said support plate and being formed with a re-entrant portion, a movable plate within said channel and adjacent said re-entrant portion, said plate extending substantially the length of said channel, plural spaced screw-threaded fasteners having a headed portion engaging the other side of said support plate and shank portion in threaded engagement with said movable plate, a shield plate positioned transversely of said support plate and between said opposed fingers, whereby flexure of said re-entrant portion by tightening said fasteners against said support plate causes said fingers to grip said shield plate.

2. A shield support and contact structure which permits insertion of a shield plate by motion either laterally of or perpendicular to a base plate comprising a resilient sheet metal channel member having a base including a re-entrant portion adjacent one side of said base plate, the sides of said channel being convergent, each of said sides formed with a plurality of fingers, said plurality of fingers oppositely disposed on said sides, said opposed fingers being spaced apart a distance greater than the thickness of said shield plate to permit easy insertion thereof, a rigid plate member within said channel adjacent said re-entrant portion, said rigid plate member extending substantially the length of said channel, and fastening means engaging said base plate and said rigid plate adapted to compress said re-entrant portion between said base plate and rigid plate thereby urging said fingers inwardly to contact said shield plate.

References Cited in the file of this patent

UNITED STATES PATENTS

| | | |
|---|---|---|
| 2,380,114 | Kurillo | July 10, 1945 |
| 2,575,819 | Laird | Nov. 20, 1951 |
| 2,711,523 | Willis | June 21, 1955 |